(12) United States Patent
    Bexar

(10) Patent No.: US 9,387,812 B2
(45) Date of Patent: Jul. 12, 2016

(54) STORAGE APPARATUS FOR A TRUCK HAVING A COLLAPSED CONFIGURATION AND AN EXPANDED CONFIGURATION

(71) Applicant: Robert J. Bexar, Houston, TX (US)

(72) Inventor: Robert J. Bexar, Houston, TX (US)

(*) Notice: Subject to any disclaimer, the term of this patent is extended or adjusted under 35 U.S.C. 154(b) by 54 days.

(21) Appl. No.: 14/550,974

(22) Filed: Nov. 22, 2014

(65) Prior Publication Data

US 2016/0144796 A1    May 26, 2016

(51) Int. Cl.
 *B60R 9/00* (2006.01)
 *B60R 9/06* (2006.01)
 *B62D 33/02* (2006.01)
 *B62D 65/02* (2006.01)

(52) U.S. Cl.
 CPC .............. *B60R 9/06* (2013.01); *B62D 33/0207* (2013.01); *B62D 65/024* (2013.01)

(58) Field of Classification Search
 CPC .......... B60R 9/00; B60R 11/06; B60R 9/065; B60R 5/04; B60R 13/01; B60R 5/041; B60R 9/02; B60R 11/00; B60P 3/14; B60P 1/435; B60P 1/003; B60P 7/02; B60P 7/0892; B60P 7/14; B60P 1/28; B60P 1/64; B60N 2/3011; B60N 2/305; B60N 2/3065; B60N 2/36; B60N 2/686; B60N 2/3013; B60N 2/3077
 USPC ......... 414/480; 296/37.6, 183.1, 39.2, 51, 50, 296/156, 100.09; 224/404, 274, 282, 402, 224/486, 555, 564
 See application file for complete search history.

(56) References Cited

U.S. PATENT DOCUMENTS

| 2,914,210 | A | * | 11/1959 | Paston | ..................... | B65D 7/26 |
| | | | | | | 217/15 |
| 4,518,194 | A | * | 5/1985 | Kirkham | .................. | B60J 7/041 |
| | | | | | | 160/84.02 |
| 4,749,226 | A | | 6/1988 | Heft | | |
| 4,828,312 | A | | 5/1989 | Kinkel et al. | | |
| 5,186,510 | A | | 2/1993 | Stapp | | |
| 5,853,116 | A | | 12/1998 | Schreiner | | |
| 6,056,177 | A | * | 5/2000 | Schneider | ................. | B60R 5/04 |
| | | | | | | 220/4.28 |
| 6,199,930 | B1 | * | 3/2001 | Riley | ...................... | B60R 11/06 |
| | | | | | | 224/404 |
| 6,401,995 | B1 | | 6/2002 | Yuille et al. | | |
| 6,536,826 | B1 | * | 3/2003 | Reed | ......................... | B60R 9/00 |
| | | | | | | 224/404 |
| 7,234,618 | B2 | | 6/2007 | Warganich | | |
| D586,123 | S | | 2/2009 | Lowrey | | |
| 8,585,116 | B2 | * | 11/2013 | King | ...................... | B62D 33/03 |
| | | | | | | 296/24.33 |

(Continued)

*Primary Examiner* — Glenn Dayoan
*Assistant Examiner* — Sunsurraye Westbrook
(74) *Attorney, Agent, or Firm* — Andrew W. Chu; Craft Chu PLLC

(57) ABSTRACT

A storage apparatus is installed in a vehicle with a flat bed and a tailgate and transforms back and forth between a collapsed configuration and an expanded configuration. The storage apparatus includes a container having a bottom panel, side walls, a lateral panel, and a top panel, a frame having a base board, side boards, support posts, slide rails, and bridge planks, and a slide member. The slide member connects the bottom panel of the container to the frame. The frame is fixed to the tailgate of the vehicle. In the collapsed configuration, the container sets on the tailgate or on the flat bed with the tailgate opened or closed. In the expanded configuration, the container cannot set on the tailgate with the tailgate closed, but the container can set on the tailgate with the tailgate opened. Opening the tailgate allows access to the storage space.

20 Claims, 4 Drawing Sheets

(56) References Cited

U.S. PATENT DOCUMENTS

| | | | | |
|---|---|---|---|---|
| 8,701,950 B2 * | 4/2014 | Roach | ................... | B60P 7/0892 220/6 |
| 2012/0181810 A1 * | 7/2012 | Alvarino | ................. | B60R 13/01 296/39.2 |
| 2013/0028693 A1 * | 1/2013 | Justak | .................... | B65G 69/30 414/480 |
| 2014/0175137 A1 | 6/2014 | Roach et al. | | |

* cited by examiner

STORAGE APPARATUS FOR A TRUCK HAVING A COLLAPSED CONFIGURATION AND AN EXPANDED CONFIGURATION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to storage containers. In particular, the present invention relates to a storage container for a vehicle with a flat bed and a tailgate. More particularly, the present invention relates to a storage container for a truck with a collapsed configuration fit against a tailgate and an expanded configuration along the flat bed.

2. Description of Related Art Including Information Disclosed Under 37 CFR 1.97 and 37 CFR 1.98.

Truck bed tool boxes are convenient storage devices. The tool box sits in the truck bed, usually near the front cab of the truck. The tool box has a lid on the top for easy access. The boxes can be made of a variety of materials for strength and durability. The tool boxes are usually heavy so that they cannot be easily removed from the truck bed. The permanent installation prevents theft. Because the prior art boxes are permanent installations, the full dimensions of the truck bed are no longer available for use. Overall storage capacity of the open truck bed is reduced by the prior art boxes. The utility and capacity of the truck bed is permanently altered by the prior art tool boxes.

Various patents have been granted in the field of collapsing storage containers, which provide the desired covered storage in the open truck bed and the restore the full dimensions of the truck bed.

U.S. Pat. No. 7,234,618, issued to Warganich on Jun. 26, 2007, discloses a collapsible storage container for vehicles. The container is connected to the bed of a pickup truck. The figures demonstrate two methods of collapsing the container. A box structure, which incorporates four side walls, a base, and a lid, is collapsed by folding portions of the base up and toward the inner side walls. The base and back side wall fold up against the tailgate.

U.S. Pat. No. 5,186,510, issued to Stapp on Feb. 16, 1993, discloses a foldable pickup truck tool box. The tool box for pickup truck beds is comprised of separate upper and lower compartments. The lower compartment collapses into a flat configuration and may be stored in the upper compartment during shipment or when not in use. The tool box further incorporates adjustable wheels attached to its base to roll on the bed of the pickup. The width of the wheels may be adjusted to coincide with the grooves in the beds of different pickup trucks. The tool box is a separate unit that can be removed from the truck.

U.S. Pat. No. 4,749,226, issued to Heft on Jun. 7, 1988, discloses a utility storage compartment for pickup trucks. The compartment is comprised of four panels connected by hinges. The panels are the width of the bed of the pickup truck and are mounted to permit access to the compartment by way of raising and lowering the tailgate. The hinges allow the panels to collapse to form a substantially flat surface. The panels collapse into the bed of the pickup truck. The hinges fold the compartment for the actuation between configurations.

Other prior art references disclose variations on collapsing and storing the collapsed container. U.S. Pat. No. 6,401,995, issued to Yuille, et al. on Jul. 11, 2002, and U.S. Design Pat. No. 586,123, issued to Lowrey on Feb. 10, 2009, both disclose collapsible storage units for a truck. The collapsible storage units are separate units that can be stored in the cab of the truck, not on the tailgate. U.S. Pat. No. 4,828,312, issued to Kinkel, et al. on May 9, 1989, discloses a collapsible security storage apparatus for truck beds, which is stored on the floor of the truck bed. U.S. Pat. No. 5,853,116, issued to Schreiner on Dec. 29, 1998, discloses a collapsible storage unit for trucks which folds over the tailgate.

It is an object of the present invention to provide an embodiment of a storage apparatus having a collapsed configuration and an expanded configuration.

It is another object of the present invention to provide an embodiment of a storage apparatus convertible between a collapsed configuration and an expanded configuration.

It is an object of the present invention to provide an embodiment of a storage apparatus with a collapsed configuration fitted against a tailgate of a truck when installed.

It is another object of the present invention to provide an embodiment of a bottom of the storage apparatus in the collapsed configuration fitted against a tailgate of a truck.

It is an object of the present invention to provide an embodiment of a storage apparatus with a collapsed configuration being slideable from a tailgate to a bed of a truck.

It is another object of the present invention to provide an embodiment of a storage apparatus with a collapsed configuration sliding onto the bed of a truck before transforming to an expanded configuration.

It is still another object of the present invention to provide an embodiment of a storage apparatus with a slide mechanism for crossing a gap between the tailgate and the truck bed, when the tailgate is lowered.

It is an object of the present invention to provide an embodiment of a storage apparatus with an expanded configuration for securing property in the open truck bed.

It is another object of the present invention to provide an embodiment of a storage apparatus with an expanded configuration having access when the tailgate is lowered.

It is still another object of the present invention to provide an embodiment of a storage apparatus with an expanded configuration having access from a top side, when the tailgate is raised.

These and other objects and advantages of the present invention will become apparent from a reading of the attached specification and appended claims.

SUMMARY OF THE INVENTION

Embodiments of the present invention include a storage apparatus installed in a vehicle with a flat bed and a tailgate. The storage apparatus has a collapsed configuration and an expanded configuration. The flat bed can become a secure space for storage without permanently altering the dimensions of the flat bed. The storage apparatus includes a container, a frame, and a slide member. The frame is permanently attached to the tailgate, and the slide member connects the frame to the container. The container can move relative to the frame, according to the slide member. The collapsed configuration has the container on the tailgate or on the flat bed, and the tailgate can be opened or closed. The expanded configuration is available when the container is on the flat bed. The tailgate can be opened to allow access to the storage space or closed to secure access to the storage space.

The container of the storage apparatus includes a bottom panel, side walls, a lateral panel, and a top panel. The bottom panel can set against the tailgate or the flat bed in the collapsed configuration. The bottom panel sets on the flat bed in the expanded configuration. The side walls are hinged to the bottom panel and actuate toward the bottom panel on hinges. The side walls fold flush to the bottom panel in the collapsed configuration and stand orthogonal to the bottom panel in the expanded configuration. The lateral panel is similarly hinged to bottom panel and actuable toward the bottom panel. The lateral panel folds flush to the bottom panel over the side walls in the collapsed configuration and stand orthogonal to the bottom panel in the expanded configuration. The lateral panel forms corners with the side walls in the expanded configuration. The top panel removeably attaches on back side of lateral panel in the collapsed configuration. In the expanded configuration, the detached top panel is mounted on top edges of the lateral panel so as to form an enclosure with open access when the tailgate is open. The enclosure is the storage space.

Embodiments of the frame include a base board, side boards, support posts, slide rails, and bridge planks. The base board is fixedly attached to the tailgate. The side boards connect orthogonally to ends of the base board and can also be permanently attached to the tailgate. The base board and side boards are dimensioned to fit the bottom panel of the container.

In some embodiments, there are pairs of support posts, slide rails and bridge planks. The pair of support posts extends from the base board in generally the same plane defined by the base board and side boards. A cross bar holds the support posts parallel to each other opposite the base board. Similarly, the pair of slide rails can extend from the base board in the same plane defined by the base board and side boards. A slide bar is fit on the slide rails so that the slide bar moves along the length of the slide rails. The slide bar can be insert holes for the slide rails to pass through or other bearings and casters for sliding movement along the slide rails. The slide bar is moveable between the base board and the cross bar of the support posts. End of the slide rails are fixed in the cross bar, opposite the base board for stable mounting of the slide rails in place. The pair of bridge planks also extends from the base board in the same plane defined by the base board and side boards. The bridge planks have folded ends opposite the ends fixed to the base board. The folded ends can be hinged flaps to fold against the bridge plank or unfold to extend the length of the bridge plank.

Embodiments of the present invention include a slide member being comprised of two slats and a cross piece. Each slat is parallel to each other and has a base end and hinge end. The hinge end attaches to the slide bar, so that the slide member can be angled from the plane defined by the base board and side boards. The slide member can range from parallel to orthogonal to this plane, corresponding to opening and closing of the tailgate relative to the flat bed. The slats are made integral with the cross piece, which strengthens the integrity of the slide member. The cross piece can be affixed at respective base ends of the two slats. The hinge ends attach to the slide bar of the frame, and the base ends engage the bottom panel of the container.

In some embodiments, the bottom panel of the container has a pair of wheel sets on a bottom surface of the bottom panel and a pair of rail guides extending across the bottom surface of the bottom panel. Each rail guide is in sliding engagement with a respective slat of the slide member so that the slide member is aligned with the pair of rail guides. Each rail guide can be comprised of a support strip, a flange piece, and a stop member, so that the slide member fits between each support strip and each flange piece. The stop member limits sliding movement along the rail guide by the slide member. The container is prevented from sliding off the rail guides by the stop members.

Each wheel set is aligned with a respective bridge plank so that the wheels roll on the bridge plank to cross from the tailgate to the flat bed. There is no gap jump, and the storage apparatus of the present invention is compatible with any grooves on the flat bed. In some embodiments, each wheel set is comprised at least two offset wheels. The spacing between the two offset wheels fitting on a respective bridge plank, and the bridge plank is dimensioned to fit any offset of wheels. The bridge plank must be sufficiently wide to cover the wheel path of the wheels on the bottom panel.

The present invention includes the method for transforming the storage apparatus between the collapsed configuration and the expanded configuration. The method includes assembly the storage apparatus, setting the collapsed configuration, engaging the slide member to the bottom panel of the container, converting from the collapsed configuration to the expanded configuration, setting the expanded configuration, and reversing back and forth between the configurations. The configurations are set according to the position of the tailgate relative to the flat bed and according to the desired use of the container and flat bed. The step of engaging further comprises inserting base ends of the slats of the slide member into the rail guides.

In some embodiments, there is the collapsed configuration with the bottom panel flush to the tailgate and aligned on the tailgate for full use of the flat bed. There is also the collapsed configuration with the bottom panel flush to the tailgate and flat bed. The bottom panel is aligned on the flat bed with the tailgate opened. The container slides from the tailgate to the flat bed for full use of the flat bed. Alternatively, the tailgate can be closed with the container still aligned on the flat bed.

In other embodiments, there is the expanded configuration with the bottom panel flush to the flat bed and aligned on the flat bed with the tailgate closed and orthogonal to the flat bed. The enclosure or storage space of the container is secured. There is also the expanded configuration with the bottom panel flush to the flat bed with the tailgate opened and parallel to the flat bed. There is access to the storage space for loading, and the container can slide from the tailgate to the flat bed.

DETAILED DESCRIPTION OF THE DRAWINGS

Figure 1:
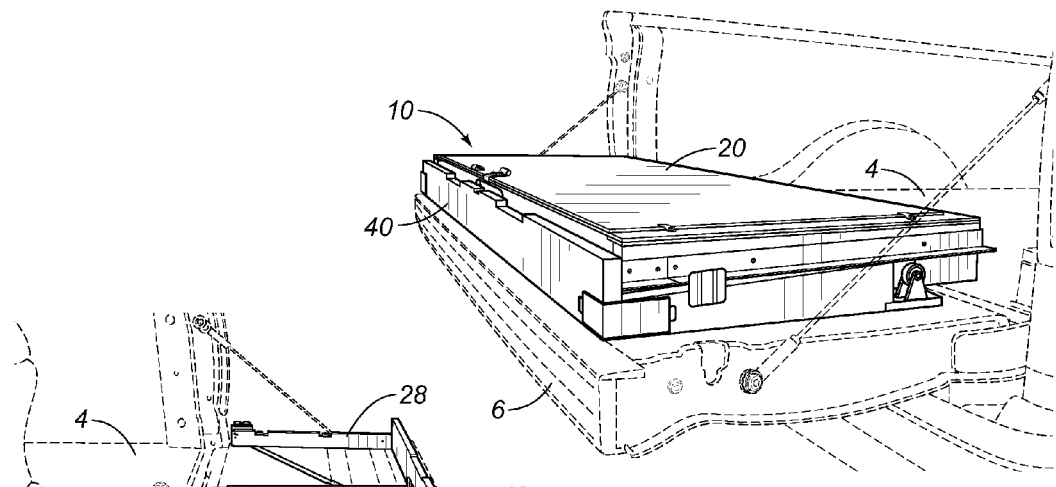
FIG. 1 is a perspective view of an embodiment of the storage apparatus installed in a vehicle with a flat bed and a tailgate in the collapsed configuration.

Referring to FIG. 1, the present invention includes an embodiment of the storage apparatus 10 installed in a vehicle 2 with a flat bed 4 and a tailgate 6. The storage apparatus 10 has a collapsed configuration and an expanded configuration. FIG. 1 shows the collapsed configuration. The flat bed 4 is an overall space for storage outside of the cab of the vehicle 2. Secure space for storage can be installed without permanently altering the dimensions of the flat bed 4. The storage apparatus 10 includes a container 20, a frame 40, and a slide member 60 (not shown in FIG. 1, shown first in FIG. 4). The frame 40 is permanently attached to the tailgate 6 as shown in FIGS. 1-4, and the slide member 60 connects the frame 40 to the container 20 in FIGS. 4, 11 and 13. The container 20 moves relative to the frame 40. FIG. 1 shows the container 20 aligned on the frame 40 and tailgate 6. The container 20 can also slide off the frame 40 and onto the flat bed 4, with the slide member 60 keeping the container 20 connected to the frame 40. The collapsed configuration of FIG. 1 has the container 20 on the tailgate 6 or on the flat bed (now shown), and the tailgate 6 can be either opened or closed. The overall space for storage in the flat bed 4 can be maintained with the closed configuration against the tail gate 6 or against the flat bed 4. The expanded configuration is available when the container 20 is on the flat bed 4. The tailgate 6 can be opened to allow access to the storage space or closed to secure access to the storage space within the container 20.

Referring to FIGS. 5-8, embodiments of the container 20 of the storage apparatus 10 include a bottom panel 12, side walls 14, a lateral panel 16, and a top panel 18. The bottom panel 12 can set against the tailgate 6 or the flat bed 4 in the collapsed configuration. The bottom panel 12 sets on the flat bed 4 in the expanded configuration. The side walls 14 are hinged to the bottom panel 12 and actuate toward the bottom panel 12 on hinges. The side walls 14 fold flush to the bottom panel 12 in the collapsed configuration and stand orthogonal to the bottom panel 12 in the expanded configuration. The lateral panel 16 is similarly hinged to bottom panel 12 and actuable toward the bottom panel 12. The lateral panel 16 folds flush to the bottom panel 12 over the side walls 14 in the collapsed configuration. The lateral panel 16 also stands orthogonal to the bottom panel 12 in the expanded configuration. The lateral panel 16 forms corners with the side walls 14 in the expanded configuration. The top panel 18 removeably attaches on back side 22 of lateral panel 16 in the collapsed configuration. In the expanded configuration, the detached top panel 18 is mounted on top edges 24 of the lateral panel 16 so as to form an enclosure with open access when the tailgate 6 is open. The enclosure is the storage space. Conventional hinges, clamps, and hinge joints are used to support the relationships between the bottom panel 12, side walls 14, lateral panel 16, and the top panel 18.

Figure 2:
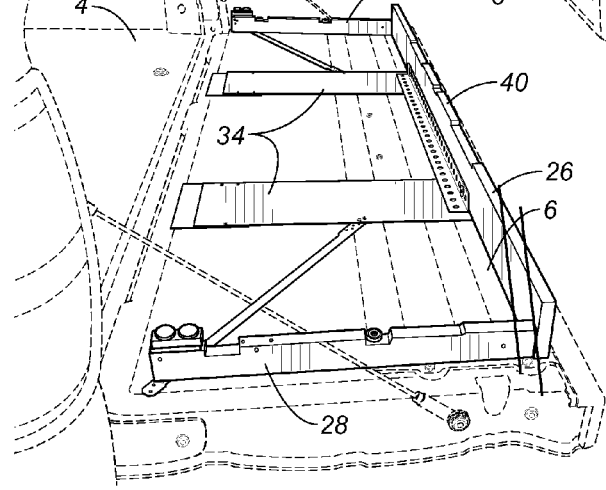
FIG. 2 is a partial exploded perspective view of an embodiment of the storage apparatus, showing a portion of the frame on the tailgate.
Figure 3:
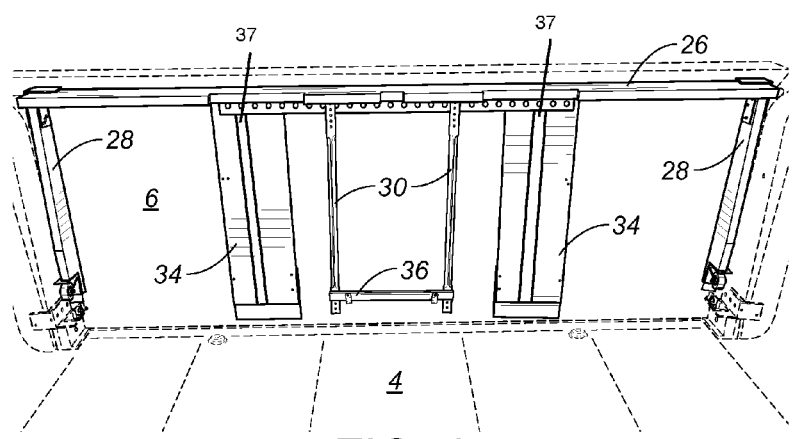
FIG. 3 is a partial exploded perspective view of an embodiment of the storage apparatus, showing a portion of the frame on the tailgate in the closed position.
Figure 4:
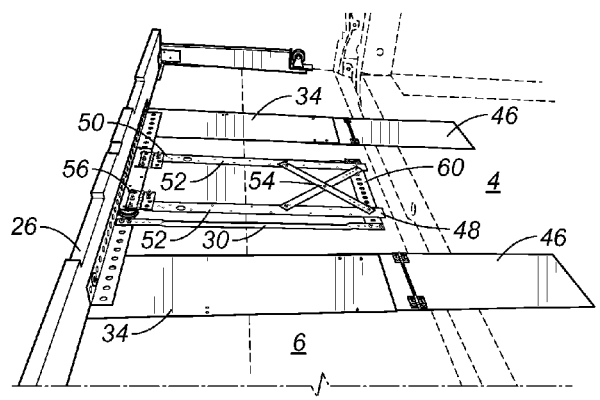
FIG. 4 is a partial exploded perspective view of an embodiment of the storage apparatus, showing a portion of the frame on the tailgate in the opened position.
Figure 5:
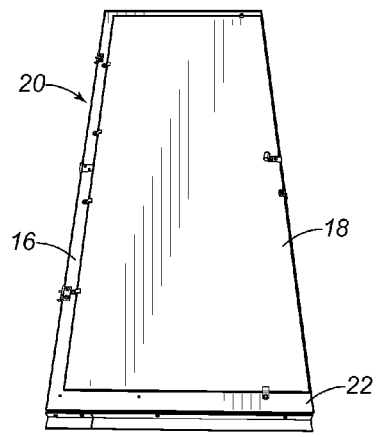
FIG. 5 is a partial perspective view of an embodiment of the storage apparatus, showing the container in the collapsed configuration.
Figure 6:
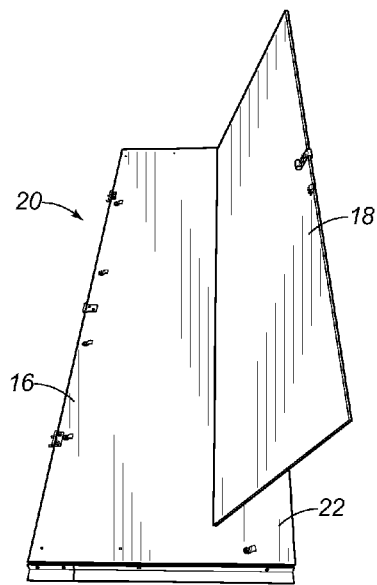
FIG. 6 is a partial perspective view of an embodiment of the storage apparatus, showing conversion of the container between the collapsed configuration and the expanded configuration.
Figure 7:
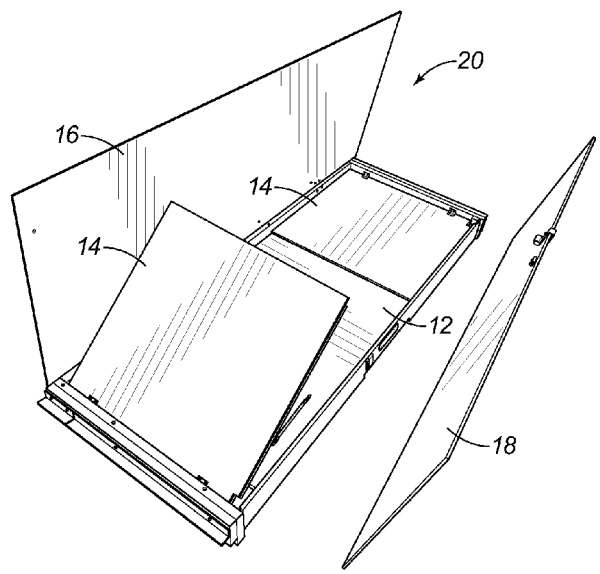
FIG. 7 is another partial perspective view of an embodiment of the storage apparatus, showing conversion of the container between the collapsed configuration and the expanded configuration.
Figure 8:
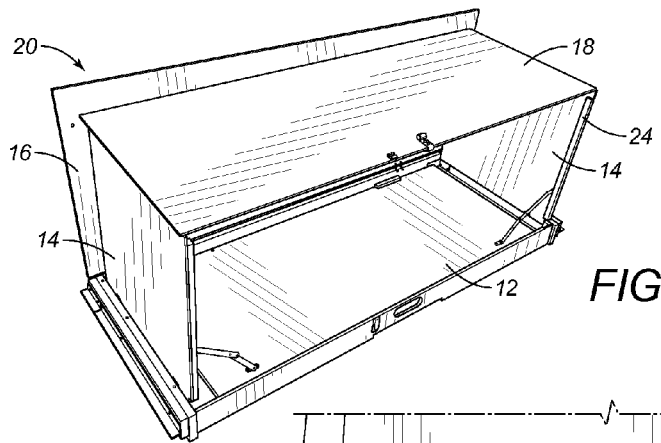
FIG. 8 is a partial perspective view of an embodiment of the storage apparatus, showing the container in the expanded configuration.

FIGS. 2-4 and 9-11 show embodiments of the frame 40 of the storage apparatus 10. The frame 40 includes a base board 26, side boards 28, support posts 30, slide rails 32, and bridge planks 34. The partial views of the frame 40 in FIGS. 2-4 shows the base board 26 fixedly attached to the tailgate 6. The side boards 28 connect orthogonally to the base board 26 and can also be permanently attached to the tailgate 6. FIGS. 2-4 show the side boards 28 connected at ends of the base board 26. The base board 26 and side boards 28 are dimensioned to fit the bottom panel 12 of the container 20. The frame 40 can protect the container 20 in the collapsed configuration.

Figure 9:
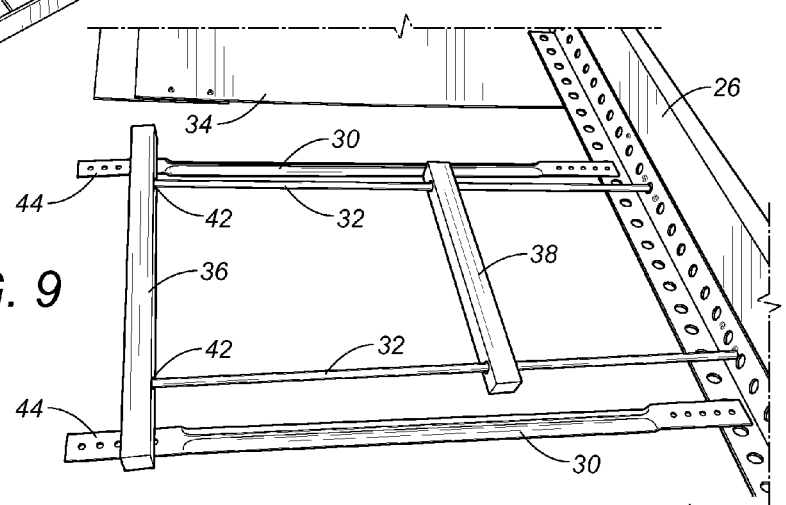
FIG. 9 is a partial exploded perspective view of an embodiment of the storage apparatus, showing a portion of the support posts and slide rails of the frame.
Figure 10:
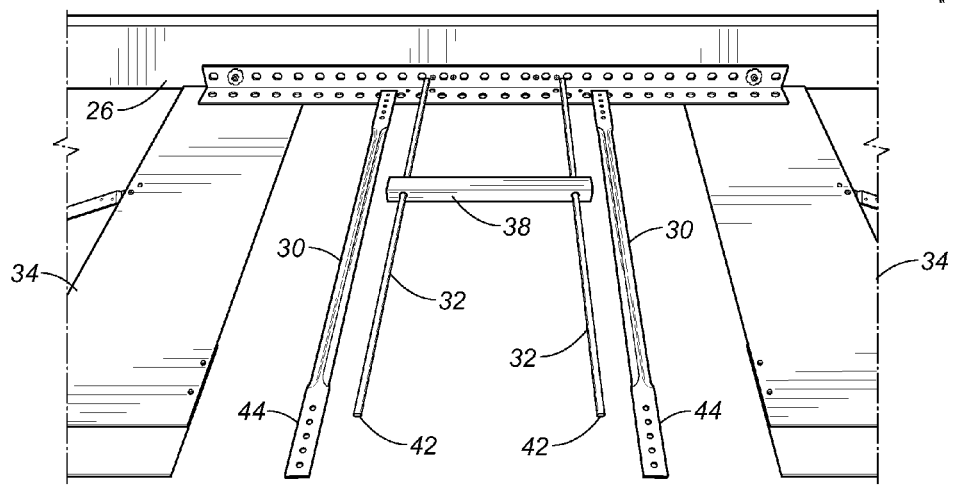
FIG. 10 is another partial exploded perspective view of an embodiment of the storage apparatus, showing a portion of the support posts and slide rails of the frame.

In some embodiments, the plurality of support posts 30, slide rails 32, and bridge planks 34 are pairs of support posts 30, slide rails 32, and bridge planks 34, as shown in FIGS. 2-4 and 9-11. The pair of support posts 30 extends from the base board 26 in generally the same plane defined by the base board 26 and side boards 28. A cross bar 36 holds ends 44 of the support posts 30 in a stable rectangular support frame. The support posts 30 are held parallel to each other opposite the base board 26. Similarly, the pair of slide rails 32 can extend from the base board 26 in the same plane defined by the base board 26 and side boards 28. A slide bar 38 is fit on the slide rails 32 so that the slide bar 38 moves along the length of the slide rails 32. The slide bar 38 can have insert holes, as shown in FIG. 9 for the slide rails 32 to pass through or other bearings and casters for sliding movement along the slide rails 32. In one embodiment, the slide rails 32 are tubular members as in FIG. 9, so that the slide bar 38 has rimmed rollers attached. The tubular members fit between the rims to engage the slide bar 38. As the rimmed rollers rotate, the slide bar 38 moves relative to the slide rails 32. The slide bar 38 is moveable between the base board 26 and the cross bar 36 of the support posts 30. Ends 42 of the slide rails 32 are fixed in the cross bar 36, opposite the base board 26 for stable mounting of the slide rails 32 in place.

FIGS. 2 and 4 show embodiments of the bridge planks 34, which also extend from the base board 26 in the same plane defined by the base board 26 and side boards 28. The bridge planks 34 are shown in pairs in FIGS. 2-4 and 9-11; each bridge plank 34 can have folded ends 46 opposite the ends 48 fixed to the base board 26. The folded ends 46 can be hinged flaps to fold against the bridge plank 34 or unfold to extend the length of the bridge plank 34. FIG. 2 shows the folded ends 46 against the bridge plank 34. FIG. 4 shows the folded ends 46 unfolded and crossing the gap between the tailgate 6 and the flat bed 4. In some embodiments, there can be a landing pad 35 affixed to the flat bed 4. The landing pad 35 can be made of plastic or wood, and can be affixed to the flat bed 4 by adhesive or other attachment means. The landing pad 35 supports the folded ends 46 above any groove on the flat bed 4. The landing pad 35 makes the bridge planks 34 compatible with any surface of the flat bed 4, having any grooves or ridges of any size on the flat bed 4. FIG. 3 shows another embodiment with the folded ends 46 unfolded and crossing the tailgate 6 to the flat bed 4, while the tailgate 6 is closed. FIG. 3 also shows an alternative with grooves 37 on the bridge planks 34. The grooves 37 can be used to guide any wheels 70 (shown in FIGS. 12-13) as the wheels 70 move along the bridge planks 34. The groove 37 is independent from any groove on the flat bed 4 so that the wheels 70 of the present invention can be compatible with the bridge planks 34 for a flat bed having any grooves of any dimension.

Figure 11:
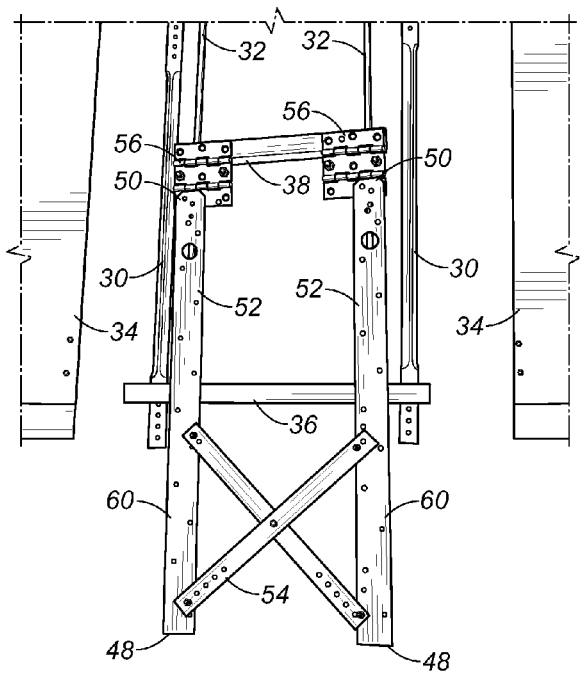
FIG. 11 is a partial exploded perspective view of an embodiment of the storage apparatus, showing a portion of the support posts and slide rails of the frame engaged with the slide member.
Figure 13:
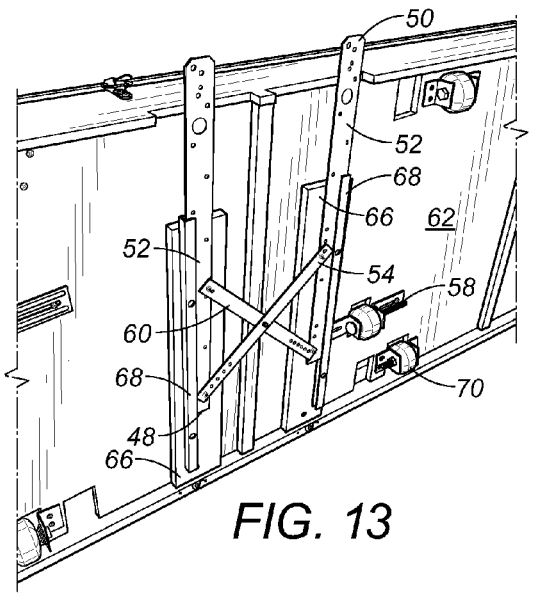
FIG. 13 is a partial exploded perspective view of an embodiment of the storage apparatus, showing a bottom surface of the bottom panel engaged with the slide member.

Embodiments of the slide member 60 of the present invention are shown in FIGS. 4, 11 and 13. The slide member 60 has a base end 48 and a hinge end 50. The base end 48 is shown in sliding engagement with the bottom panel 12 in FIG. 13. The hinge end 50 is shown in pivotal attachment to the slide bar 38 of the frame 40 in FIGS. 4 and 11. The range of motion across the frame 40 is defined by movement of the slide bar 38 from the base board 26 to the cross bar 36 The slide member 60 actuates the container 20 relative to the frame 40. The slide bar 38 moves across the frame 40 so that the slide member 60 can hinge at different positions across the frame 40. When the slide bar 38 is flush with the base board 26, the slide member 60 maintains the container 20 planar with the tailgate 6, whether the container 20 is on the tailgate 6 or on the flat bed 4. The slide member 60 allows translational movement between the tailgate 6 and the flat bed 4. When the slide bar 38 is flush with the cross bar 36 away from the base board 26, the slide member 60 can hinge so that the container 20 is on the flat bed 4 and the tailgate 6 can be closed.

FIGS. 4, 11 and 13 shows the slide member 60 having two slats 52 and a cross piece 54. Each slat 52 is parallel to each other and has a corresponding base end 48 and hinge end 50. The hinge end 50 attaches to the slide bar 38, so that the slide member 60 can be angled from the plane defined by the base board 26 and side boards 28. FIG. 11 shows a hinge 56 at the connection between the slide member 60 and the slide bar 38. The slide member 60 can range from parallel to orthogonal to this plane defined by the base board 26 and side boards 28, corresponding to opening and closing of the tailgate 6 relative to the flat bed 4. The slats 52 are made integral with the cross piece 54, which strengthens the integrity of the slide member 60. The cross piece 54 can be affixed at respective base ends 48 of the two slats 52. The hinge ends 50 attach to the slide bar 38 of the frame 40 as in FIG. 11, and the base ends 48 engage the bottom panel 12 of the container 20 as in FIG. 13. Alternative, each slat 52 can be comprised of outer slide elements and inner slide elements, such that at least one outer slide element engages the container 20 at the base end 48 and at least one inner slide element engages the frame 40 at the hinge end 50. This alternate slide member 60 can engage the container 20 in one position, while the hinge end 50 on the inner slide element slides along the length of the outer slide element. The entire slide member 60 does not have to move along the sliding distance from the base board 26 to the cross bar 36. The outer slide element is fixed to the container 20, and the inner slide member actuates within the outsider slide element as attached to the slide bar 28 by the hinged end 48 on the inner slide element. Sliding elements housed within each other affects assembly and shipping of parts for the invention. Also, there is less movement of the slide member 60 relative to the container 20, and the engagement to the container 20 is more stable along the outer slide element in all positions. The inner slide member and hinged end 48 retain the same movement range and pivoting relative to the frame 40.

Figure 12:
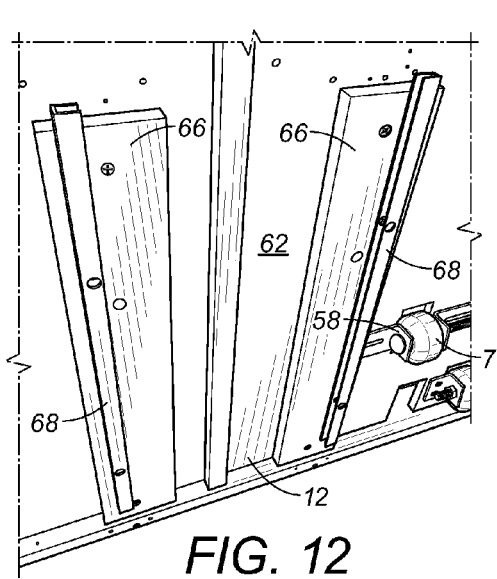
FIG. 12 is a partial exploded perspective view of an embodiment of the storage apparatus, showing a bottom surface of the bottom panel of the container.

In some embodiments of the container 20 of the present invention, as shown in FIGS. 12 and 13, the bottom panel 12 of the container 20 has a pair of wheel sets 58 on a bottom surface 62 of the bottom panel 12 and a pair of rail guides 64 extending across the bottom surface 62 of the bottom panel 12. The bottom surface 62 interacts with the slide member 60 for connection to the frame 40 anchored on the tailgate 6. FIGS. 12-13 show each rail guide 64 in sliding engagement with a respective slat 52 of the slide member 60 so that the slide member 60 maintains alignment with the pair of rail guides 64. Each rail guide 64 can be comprised of a support strip 66, and a flange piece 68. The slide member 60 fits between each support strip 66 and each flange piece 64. In particular, a slat 52 slides between the support strip 66 and the flange piece 64 for a sliding engagement. The bottom panel 12, and thus the container 20, can slide along the slide rails 32 and along the rail guides 64. The container 20 can slide from the base board 26 of the frame 40 at the edge of the tailgate 6 to the cross bar 36 at the opposite edge of the tailgate 6. For the expanded configuration, the container 20 can slide to the cross bar 36 and onto the flat bed 4, while the tailgate 6 can open and close as the frame 40 hinges at the slide member 60 at the slide bar 38. In some embodiments, each rail guide 64 further includes a stop member, which limits sliding movement along the rail guide 64 by the slide member 60. The container 20 is prevented from sliding off the rail guides 64 by the stop members.

FIGS. 12-13 also show an embodiment of each wheel set 58 being aligned with a respective bridge plank 34 so that the wheels 70 roll on the bridge plank 34 to cross between the tailgate 6 and the flat bed 4. There is no gap jump, and the storage apparatus 10 of the present invention is now compatible with any grooves on the flat bed 4 of any truck. In some embodiments, each wheel set 58 is comprised at least two offset wheels 70. FIG. 13 shows two wheels 70 on the bottom surface 62 away from the base board 26 and a third wheel 70 near the base board 26. One wheel 70 is closer to the support bars 30 than the other wheel 70, so that the wheel path of each wheel is different. The third wheel 70 is only aligned with one of the two wheels 70 away from the base board 26. The spacing between the two offset wheels 70 fit on a respective bridge plank 34. The bridge plank 34 is dimensioned to fit any offset of wheels 70. The bridge plank must be sufficiently wide to cover the wheel path of the wheels 70 on the bottom panel 12. FIG. 3 shows the earlier embodiment with a groove 37 on the bridge planks 34 for wheels 70 in alignment. The wheels 70 can be aligned. The offset wheels 70 of FIG. 13 are shown with a flat bridge plank 34, but there could also be grooves 37 for offset wheels 70.

Embodiments of the present invention include the method for transforming the storage apparatus 10 between the collapsed configuration and the expanded configuration. The method includes assembling the storage apparatus 10 with the container 20, the frame 40 and slide member 60, setting the collapsed configuration, engaging the slide member 60 to the bottom panel 12 of the container 20, converting from the collapsed configuration to the expanded configuration, setting the expanded configuration, and reversing back and forth between the configurations. The configurations can be set according to the position of the tailgate 6 relative to the flat bed 4 and according to the desired use of the container 20 and flat bed 4. The step of engaging the slide member 60 further comprises inserting base ends 50 of the slats 52 of the slide member 60 into the rail guides 64 on the bottom surface 62 of the bottom panel 12.

FIG. 1 shows the collapsed configuration with the bottom panel flush to the tailgate and aligned on the tailgate for full use of the flat bed. The tailgate can be opened or closed. The side walls are folded flush to the bottom panel, and the lateral panel is folded flush to the bottom panel and over the side walls. The top panel is removeably attached on back side of the lateral panel. The bridge planks have folded ends folded against the bridge planks, as shown in FIG. 2. The slide member 60 is engaged to the bottom panel 12 of the container 20 by sliding the base end into the rail guides. The slats of the slide member fit into the slide rails. The container 20 has translational movement along the rail guides. The slide member 60 is also guided by slide rails on the frame 40, which is attached to the tailgate.

The collapsed configuration can also be set with the bottom panel flush to the tailgate and flat bed. The bottom panel is aligned on the flat bed with the tailgate opened. The container slides from the tailgate to the flat bed for full use of the flat bed. The bridge planks have folded ends unfolded to cover the gap between the tailgate and the flat bed, as shown in FIG. 4. When the tailgate is closed, the folded ends are orthogonal to the bridge planks in FIG. 3.

In other embodiments of the method, the expanded configuration is set, and the tailgate can be opened or closed. The side walls stand orthogonal to the bottom panel, and the lateral panel stands orthogonal to the bottom panel. The side walls and lateral panel form corners, and the top panel is mounted on top edges of the lateral panel and side walls. The enclosure or storage space of the container is secured. FIG. 3 shows the folded ends of the bridge planks for the expanded configuration with the tailgate closed. The bottom panel is flush to the flat bed and aligned on the flat bed with the tailgate closed and orthogonal to the flat bed. The wheel sets on the bottom surface of the bottom panel and align with the bridge planks. The wheel sets cross over the bridge planks and folded ends so as to cross from the tailgate to the flat bed.

FIG. 4 shows the folded ends of the bridge planks for the expanded configuration with the tailgate opened. The bottom panel is flush to the flat bed with the tailgate opened and parallel to the flat bed. There is access to the storage space for loading, and the container can slide from the tailgate to the flat bed.

The storage apparatus 10 is convertible between the collapsed configuration and the expanded configuration. The tail gate can be opened or closed, and the container can be aligned on the tailgate or on the flat bed. For the present invention, the expanded configuration can be set with the container on the flat bed with the tailgate opened for access or closed for security. The expanded configuration can be set with the container on the tailgate only when the tailgate is opened. For the collapsed configuration, any combination of the open or closed tail gate and alignment on the tailgate or flat bed is possible.

The present invention provides a storage apparatus having a collapsed configuration and an expanded configuration. The storage apparatus converts between the configurations, and the container of the storage apparatus moves between the tailgate and the flat bed. The user can set the storage apparatus according to individual needs.

To use the full dimension of the flat bed, the storage apparatus in the collapsed configuration is fitted against a closed tailgate. Another way to use the full dimension of the flat bed, the storage apparatus in the collapsed configuration is set on the flat bed with the tailgate closed or open. Still another way to use the full dimension of the flat bed, the storage apparatus in the collapsed configuration is set on the tailgate with the tailgate open.

To store items in the container, the storage apparatus is set in the expanded configuration. The tailgate is closed with the container on the flat bed, which secures the items in an enclosure. The dimensions of the flat bed are temporarily altered. When the tailgate is opened, access is available to the container on the flat bed or on the tailgate. The container is slideable back and forth from the tailgate to the flat bed, so that the user can easily reach the container on the tailgate, instead of stretching onto the flat bed. Items can be loaded by users with different reaches. The folded ends of the bridge planks cross the gap between the tailgate and the truck bed. The container can now more easily slide between the tailgate and the flat bed. In some embodiments, there is also access to the container through the top panel. The top panel can open as a lid, when the tailgate is opened or closed.

The foregoing disclosure and description of the invention is illustrative and explanatory thereof. Various changes in the details of the described method can be made without departing from the true spirit of the invention.

I claim:

1. A storage apparatus installed in a vehicle with a flat bed and a tailgate, said storage apparatus having a collapsed configuration and an expanded configuration, said storage apparatus comprising:
   a container comprised of a bottom panel, a plurality of side walls, a lateral panel, and a top panel, said side walls being hinged to said bottom panel, said lateral panel being hinged to said bottom panel, said top panel being removeably attached to said lateral panel;
   a frame comprised of a base board fixedly attached to the tailgate, a plurality of side boards connected orthogonally to said base board, a pair of support posts extending orthogonally from said base board, a plurality of slide rails extending orthogonally from said base board between the support posts, and a plurality of bridge planks extending from said base board, wherein said support posts, said slide rails, and said bridge planks are planar and generally parallel with each other, and wherein each bridge plank has a folded end opposite said base board,
   wherein said frame further comprises:
      a cross bar, holding the support posts parallel to each other, said cross bar attached to ends of the support posts opposite said base board; and
      a slide bar, holding said slide rails parallel to each other, said slide bar being moveable along said slide rails, wherein ends of said slide rails mount in said cross bar, opposite said base board; and
   a slide member having a base end and hinge end, said base end being in sliding engagement with said bottom panel of said container, said hinge end being pivotally attached to said slide bar of said frame.

2. The storage apparatus having said collapsed configuration and said expanded configuration, according to claim 1, in the collapsed configuration, wherein said side walls are actuated toward the bottom panel, said side walls being folded flush to the bottom panel, wherein said lateral panel is actuated toward the bottom panel, said lateral panel being folded flush to the bottom panel and over said side walls, and wherein said top panel is stored on a back side of said lateral panel.

3. The storage apparatus having said collapsed configuration and said expanded configuration, according to claim 1, in the expanded configuration, wherein said side walls are actuated away from the bottom panel, said side walls standing orthogonal to the bottom panel, wherein said lateral panel is actuated away from the bottom panel, said lateral panel standing orthogonal to the bottom panel, said lateral panel forming corners with said side walls in the expanded configuration, and wherein said top panel is mounted on a top edge of lateral panel in the expanded configuration, so as to form an enclosure with storage space.

4. The storage apparatus having said collapsed configuration and said expanded configuration, according to claim 1, wherein said side boards connected orthogonally to ends of the base board and are fixedly attached to the tailgate.

5. The storage apparatus having said collapsed configuration and said expanded configuration, according to claim 1, wherein said base board and said side boards are dimensioned to fit the bottom panel.

6. The storage apparatus having said collapsed configuration and said expanded configuration, according to claim 1, wherein said slide member is comprised of two slats and a cross piece, each slat being parallel to each other and made integral with the cross piece, the cross piece affixed at respective base ends of the two slats.

7. The storage apparatus having said collapsed configuration and said expanded configuration, according to claim 1, wherein said bottom panel is comprised of a pair of wheel sets on a bottom surface of said bottom panel and a pair of rail guides extending across said bottom surface.

8. The storage apparatus having said collapsed configuration and said expanded configuration, according to claim 6, wherein each rail guide is in sliding engagement with a respective slat of said slide member.

9. The storage apparatus having said collapsed configuration and said expanded configuration, according to claim 8, wherein said slide member is aligned with said pair of rail guides, and wherein respective base ends of said slide member and said cross piece engage said rail guides.

10. The storage apparatus having said collapsed configuration and said expanded configuration, according to claim 7, each rail guide being comprised of a support strip and a flange piece, said slide member fitting between each support strip and each flange piece.

11. The storage apparatus having said collapsed configuration and said expanded configuration, according to claim 7, wherein each wheel set is aligned with a respective bridge plank.

12. The storage apparatus having said collapsed configuration and said expanded configuration, according to claim 11, wherein each wheel set is comprised at least two offset wheels, and wherein spacing between the two offset wheels fits on a respective bridge plank.

13. A method for transforming a storage apparatus, installed in a vehicle with a flat bed and a tailgate, between a collapsed configuration and an expanded configuration, said method comprising the steps of:
assembling a storage apparatus comprised of a container, a frame, and a slide member connecting said container to said frame, according to claim 1, said bottom panel of said container having rail guides;
setting said collapsed configuration, said side walls being folded flush to the bottom panel, said lateral panel folded flush to the bottom panel and over the side walls, said top panel removeably attached on back side of lateral panel;
engaging said slide member with said rail guides of said bottom panel by sliding said base end into said rail guides;
converting from said collapsed configuration to said expanded configuration, when said bottom panel is flush with the flat bed;
setting said expanded configuration with said bottom panel set on the flat bed, said side walls orthogonal to the bottom panel, said lateral panel orthogonal to the bottom panel, said top panel mounted on top edges of said lateral panel and said side walls.

14. The method for transforming a storage apparatus, according to claim 13, wherein said slide member is comprised of slats and a cross piece, the step of engaging further comprising inserting base ends of said slats of said slide member into said rail guides, each rail guide having a stop member to limit sliding of the slide member along a respective rail guide.

15. The method for transforming a storage apparatus, according to claim 13, said collapsed configuration with said bottom panel flush to the tailgate and aligned on the tailgate,
wherein said bridge planks have folded ends, said folded ends being folded toward said base board, and
wherein said slide bar is generally flush to said base board, said hinge end of said slide member affixed to said slide bar, said slide member being retracted within said rail guides.

16. The method for transforming a storage apparatus, according to claim 13,
wherein said folded ends of said pair of bridge planks are unfolded away from said base board and across the tailgate to the flat bed, said folded ends orthogonal to said bridge planks, and
wherein said slide bar is generally flush to said cross bar of said support posts, said hinge end of said slide member actuated to be angled from a plane of the rail guides and side boards, said slide member being retracted within said rail guides,
said bottom panel being flush to the flat bed and aligned on the flat bed with the tailgate closed, when in said collapsed configuration, and
said bottom panel being flush to the flat bed and aligned on the flat bed with the tailgate closed and orthogonal to the flat bed, when in said expanded configuration.

17. The method for transforming a storage apparatus, according to claim 16,
wherein said bottom panel is comprised of a pair of wheel sets on a bottom surface of said bottom panel and a pair of rail guides extending across said bottom surface, wherein each wheel set is aligned with a respective bridge plank, wherein each wheel set crosses over the respective bridge plank and folded ends so as to cross from the tailgate to the flat bed.

18. The method for transforming a storage apparatus, according to claim 13,
wherein said folded ends of said pair of bridge planks are unfolded away from said base board and across the tailgate to the flat bed, said folded ends planar with said bridge planks, and
wherein said slide bar has a range of movement from said base board to said cross bar of said support posts along said slide rails, according to alignment of said bottom panel on the tailgate and the flat bed,
said bottom panel being flush to the tailgate and flat bed, and aligned on the flat bed with the tailgate opened, when in said collapsed configuration, and
said bottom panel being flush to the flat bed with the tailgate opened and parallel to the flat bed, when in said expanded configuration.

19. The method for transforming a storage apparatus, according to claim 18, wherein said bottom panel is comprised of a pair of wheel sets on a bottom surface of said bottom panel and a pair of rail guides extending across said bottom surface, wherein each wheel set is aligned with a respective bridge plank, wherein each wheel set crosses over the respective bridge plank and folded ends so as to cross from the tailgate to the flat bed.

20. The method for transforming a storage apparatus, according to claim 13, further comprising the step of:
reversing said expanded configuration to said collapsed configuration.

* * * * *